UNITED STATES PATENT OFFICE.

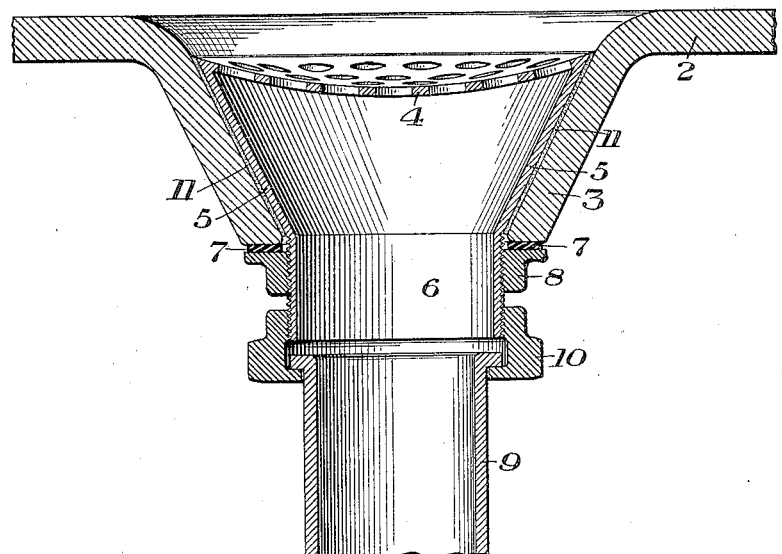
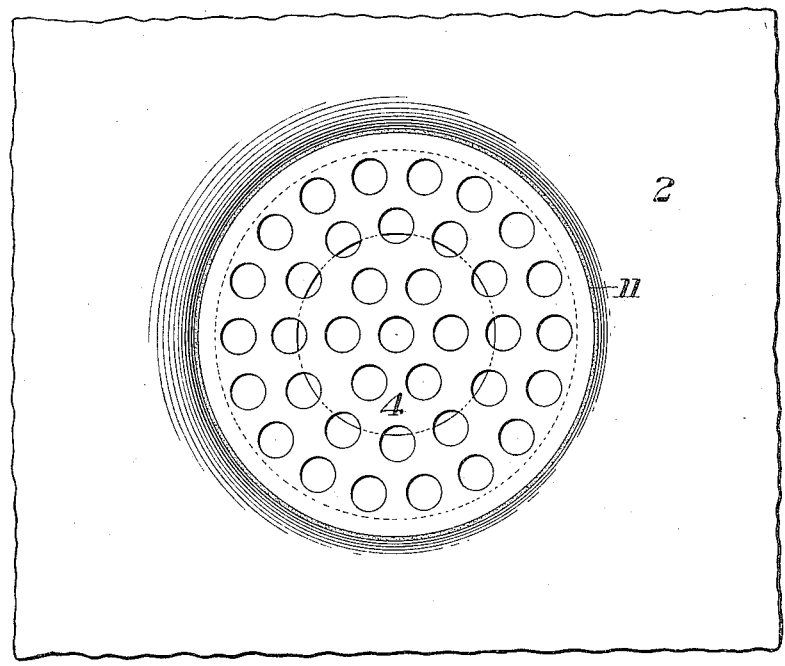

JAMES H. DANVER, OF BEAVER, PENNSYLVANIA, ASSIGNOR TO UNITED STATES SANITARY MANUFACTURING COMPANY, OF PITTSBURGH, PENNSYLVANIA, A CORPORATION OF PENNSYLVANIA.

LAVATORY, SINK, &c.

1,070,424.  Specification of Letters Patent.  Patented Aug. 19, 1913.

Application filed October 6, 1909.  Serial No. 521,320.

*To all whom it may concern:*

Be it known that I, JAMES H. DANVER, of Beaver, Beaver county, Pennsylvania, have invented a new and useful Improvement in Lavatories, Sinks, &c., of which the following is a full, clear, and exact description, reference being had to the accompanying drawings, forming part of this specification, in which—

Figure 1 is a vertical section showing my invention; and Fig. 2 is a plan view of the same.

My invention has relation to improvements in sinks, lavatories, bath tubs, etc., and is designed to provide a novel form of outlet connection therefor, which can be made at a relatively low cost; which will readily adapt itself to variations or irregularities of manufacture, and which will obviate the necessity for forming sharp bends or depressions in the lavatory or other receptacle of a nature to cause cracking or breaking of the enamel.

My invention will be best understood by reference to the accompanying drawings, in which I have shown the preferred embodiment thereof, and which will now be described, it being premised, however, that various changes may be made in the details of construction and arrangement of the parts without departing from the spirit and scope of my invention as defined in the appended claims.

In these drawings, the numeral 2 designates a portion of a lavatory, sink, bath tub, or other receptacle, and which may be either of porcelain or of enameled metal. The lavatory, or other receptacle, is provided with the outlet portion 3, which is in the form of a depression of frusto conical form. Fitted within this outlet depression is a coupling and strainer member consisting of the perforated top portion 4, the tapered or conical portion 5, and the straight, exteriorly threaded lower end portion 6. This member is preferably formed in one piece, the taper of the portion 5 being approximately the same as the taper of the interior wall of the depressed portion 3.

7 designates a gasket, which is seated between the lower end of the depression 3 and a nut 8 which is screwed on the threaded portion 6.

9 is the outlet pipe, and 10 is a coupling of any suitable character connecting said pipe with the portion 6 and screw-threaded thereon.

By reason of the tapered form of the outlet depression 3 and of the portion of the coupling and strainer which fits therein, it will be readily seen that the latter will adapt itself to considerable variations such as often occur in manufacture in the internal diameter of the outlet opening. The coupling and strainer member is usually secured within said opening by lead, cement, or other suitable material, such as indicated at 11, and which will also compensate for irregularities of the surface or shape of the inner wall of said opening.

The strainer and coupling member can be readily manufactured at a low cost; and can be quickly applied and seated and secured in such manner as to prevent leakage.

It is not essential that the strainer portion of the device shall be formed integral with the cone-shaped portion, since obviously it may be formed separately and attached thereto in any well known manner.

It will be noted that by reason of the manner in which said member is seated and secured within the outlet opening of the receptacle, it is unnecessary to provide the latter adjacent to the outlet opening with supporting shelves or ledges of a nature to collect dirt. Such ledges or shelves are also objectionable, particularly where enameled metal is employed, for the reason that the enamel becomes easily broken and flakes off at such points.

What I claim is:—

1. The combination with a lavatory, sink, or the like, having an outlet opening, and a frusto-conical depression surrounding said opening, the walls of said opening merging by unbroken curves into the floor line of the lavatory or sink, of a coupling member, comprising a hollow frusto-conical body of less diameter at its larger end than the largest diameter of said opening and having its upper end closed by a perforated strainer plate, and terminating at its smaller end in an externally threaded cylindrical extension, which projects below the lower end of said depression, and a securing nut engaging the said extension, the conical inner walls of the depression and the outer surface of said body portion having a corresponding taper and being free from projections, and the nut acting to draw said body portion downwardly within the depression; substantially as described.

2. In an enameled metal sink or the like having a comparatively flat bottom, a drain connection therefor devoid of angular shoulders in the enameled surface of the sink bottom, comprising the sink bottom having a drain opening therein with its upper portion rounding into flaring inclined walls of a funnel-like shape which gradually merge with the surface of the main portion of the sink bottom, a drain pipe, a connector between the drain pipe and the sink passing through the drain opening and provided with a flaring bearing surface to fit against the flaring funnel-like portion of the drain opening and means on the connector for engaging the lower edge of the drain opening for clamping the connector against the enameled surface of the drain opening.

In testimony whereof, I have hereunto set my hand.

JAMES H. DANVER.

Witnesses:
GEO. B. BLEMING,
GEO. H. PAMELEE.

Copies of this patent may be obtained for five cents each, by addressing the "Commissioner of Patents, Washington, D. C."